United States Patent [19]

Nakagawa et al.

[11] 3,813,872

[45] June 4, 1974

[54] BALANCE WHEEL ASSEMBLY FOR AN ELECTRIC TIMEPIECE

[75] Inventors: Yasuichi Nakagawa, Tokyo; Tadashi Sakuma, Funabashi, both of Japan

[73] Assignee: Kabushiki Kaisha Daini Seikosha, Tokyo, Japan

[22] Filed: Nov. 27, 1972

[21] Appl. No.: 309,655

[30] Foreign Application Priority Data

Nov. 26, 1971 Japan.............................. 46-110931

[52] U.S. Cl...................... 58/28 A, 58/107, 310/36, 331/154
[51] Int. Cl. ...................... G04c 3/04, G04b 17/00
[58] Field of Search........ 58/28 A, 107; 310/36, 37; 331/154

[56] References Cited
UNITED STATES PATENTS 3,161,012  12/1964  Hug et al. .......................... 58/28 A
3,620,492  6/1972  Takamune et al. ................. 58/28 A Primary Examiner—Richard B. Wilkinson
Assistant Examiner—Edith Simmons Jackmon
Attorney, Agent, or Firm—Robert E. Burns; Emmanuel J. Lobato; Bruce L. Adams

[57] ABSTRACT

A balance wheel assembly for an electric timepiece comprises a balance staff, upper and lower balance wheels connected in opposed spaced-apart relationship relative to each other to the balance staff, and permanent magnets affixed to each balance wheel. Each balance wheel has a nonmagnetic portion in contact with the balance staff and a magnetic portion spaced apart from the balance staff. The permanent magnets are affixed to the magnetic portions of the balance wheels and define therewith magnetic flux paths spaced from the balance staff thereby minimizing magnetic flux leakage to the balance staff and adjoining components.

8 Claims, 5 Drawing Figures

PATENTED JUN 4 1974

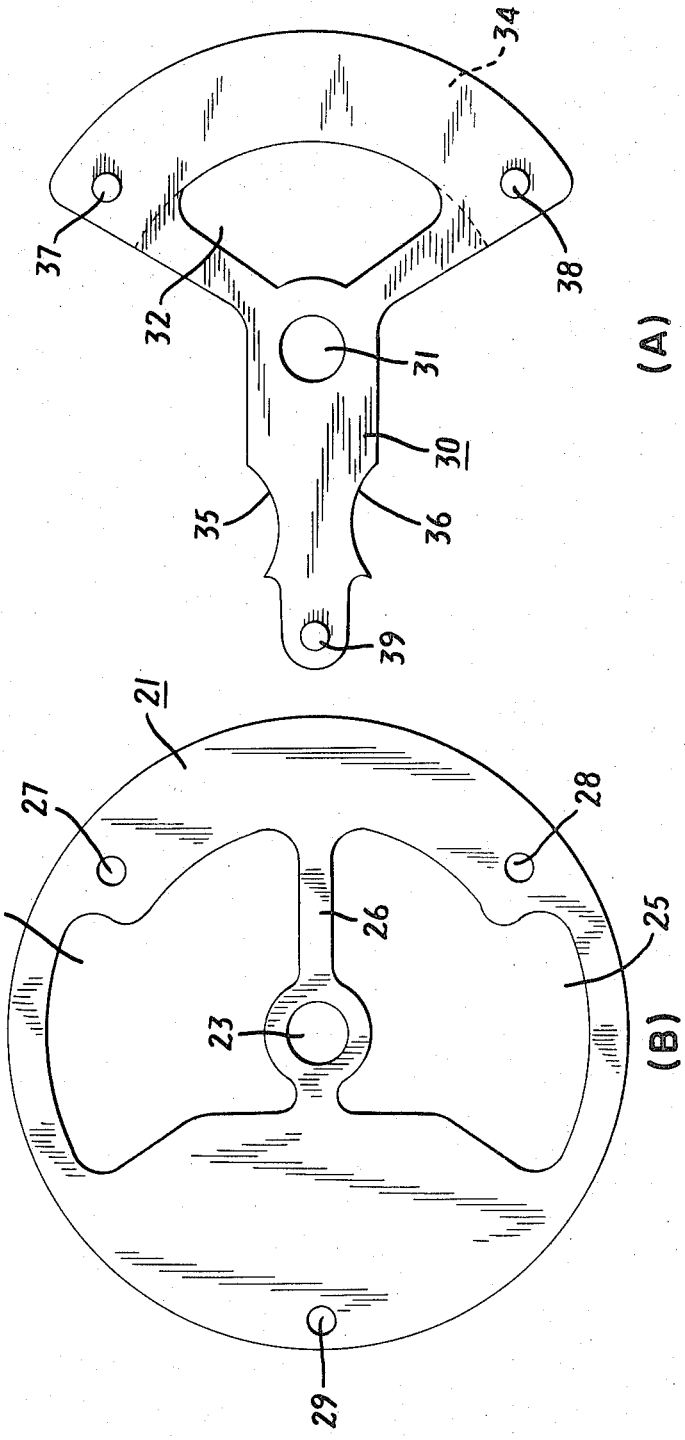

BALANCE WHEEL ASSEMBLY FOR AN ELECTRIC TIMEPIECE

The present invention relates to a balance wheel assembly for an electric timepiece.

Various types of balance wheel assemblies are known in the art. The most common type of balance wheel assembly comprises a balance staff and a pair of identical balance wheels composed of magnetic material having a high magnetic permeability. The pair of balance wheels are mounted in spaced-apart and parallel relationship on the balance staff and a permanent magnet is mounted on each balance wheel in confronting relationship with respect to each other. Then, during usage of the balance wheel assembly, a drive coil or a detecting coil is disposed between the pair of confronting permanent magnets and coacts therewith during oscillation of the balance wheel assembly in a manner well known in the art.

Many attempts have been made in the art to reduce the weight of the balance wheel assembly without lowering the moment of inertia of the balance wheels. One attempt has been to decrease the thickness of the balance wheels but this technique is undesirable since it becomes difficult to tightly mount the thin balance wheels on the balance staff. In addition, the strength of thin balance whels is so low that the slightest shocks imparted thereto during the manufacturing process createes permanent warpage and deformation of the balance wheels. Moreover, during adjustment of the timepiece or during the replacement of the hairspring or other components, the balance wheels are frequently subjected to minor shocks and therefore the balance wheels must have sufficient strength to withstand these forces.

Another disadvantage of forming the balance wheels out of a material having a high magnetic permeability is that it is quite difficult to cut or mill these materials in the small sizes and configurations required for small timepieces.

Another technique has been to form the balance wheels out of a nonmagnetic material and then mount a magnetic support plate upon the nonmagnetic material. The permanent magnets are then affixed to the magnetic support plate to form the balance wheel and this technique is disadvantageous since the magnetic flux path is not closed and such results in inefficient energy conversion. Another disadvantage is that the magnetic flux leaks out of the open magnetic path and this flux leakage disturbs the isochronism of the balance wheels.

It is therefore a primary object of the present invention to provide a balance wheel assembly for an electric timepiece which overcomes the aforementioned drawbacks and which is easy to assemble and has a rigid construction.

Another object of the present invention is to provide a balance wheel assembly having a pair of balance wheels each having a magnetic portion and a nonmagnetic portion thereby simplifying the mechanical cutting or milling steps.

A still further object of the present invention is to provide a balance wheel assembly for an electric timepiece which minimizes and essentially avoids any magnetic flux leakage to the hairspring of the timepiece.

The above and other objects of the invention are carried out by constructing each balance wheel out of both a nonmagnetic material and a magnetic material. The nonmagnetic material is made thick enough to effect a tight connection between the balance staff and the balance wheel and the magnetic material is made very thin thereby simplifying the cutting or milling processes. The nonmagnetic material overlies and reinforces the magnetic material so that the magnetic material may be made as thin as possible. Both the magnetic material and the nonmagnetic material are provided with cutout portions which further reduce the weight of the balance wheel. The magnetic portion of at least one balance wheel forms a closed magnetic flux path and consequently even though the balance wheel is disposed in close proximity to the hair spring, the closed magnetic path minimizes flux leakage to the hairspring thereby maintaining the isochronism of the balance wheel assembly.

Having in mind the above and other objects that will be evident from an understanding of this disclosure, the present invention comprises the combinations and arrangements of parts as illustrated in the presently preferred embodiment of the present invention which is hereinafter set forth in sufficient detail to enable those persons skilled in the art to clearly understand the function, operation, construction and advantages of it when read in conjunction with the accompanying drawings, wherein like reference characters denote like parts of the various views, and wherein:

FIG. 2 is a plan view of the upper balance wheel shown in its disassembled state;

Figure 1:
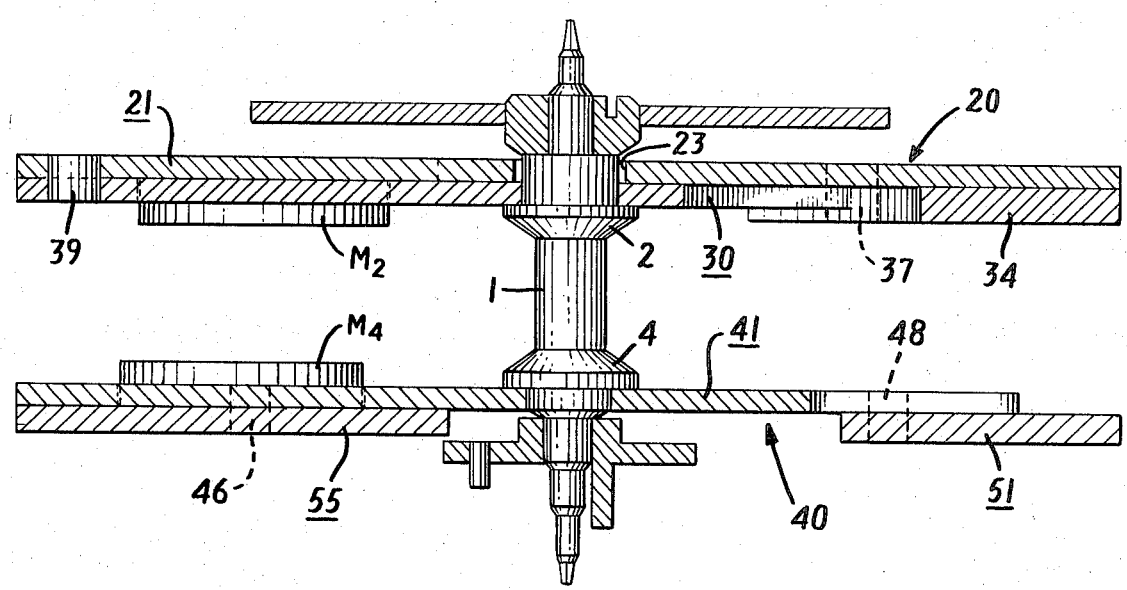
FIG. 1 is a horizontal cross-sectional view of a balance wheel assembly constructed in accordance with the principles of the present invention.

The balance wheel assembly is shown in FIG. 1 and comprises a balance staff 1 having connected thereto an upper balance wheel 20 and a lower balance wheel 40. The upper and lower balance wheels are mounted in spaced-apart opposing relationship from each other and are rigidly connected to the balance staff for rotation therewith during use of the balance wheel assembly. The balance staff 1 has an upper flange 2 engageable with the upper balance wheel 20 and a lower flange 4 engageable with the lower balance wheel 40 for facilitating the positioning and attachment of the balance wheels to the balance staff. A set of permanent magnets $M_1$, $M_2$ and $M_3$, $M_4$ is affixed to each of the upper and lower balance wheels to complete the balance wheel assembly.

Figure 3:
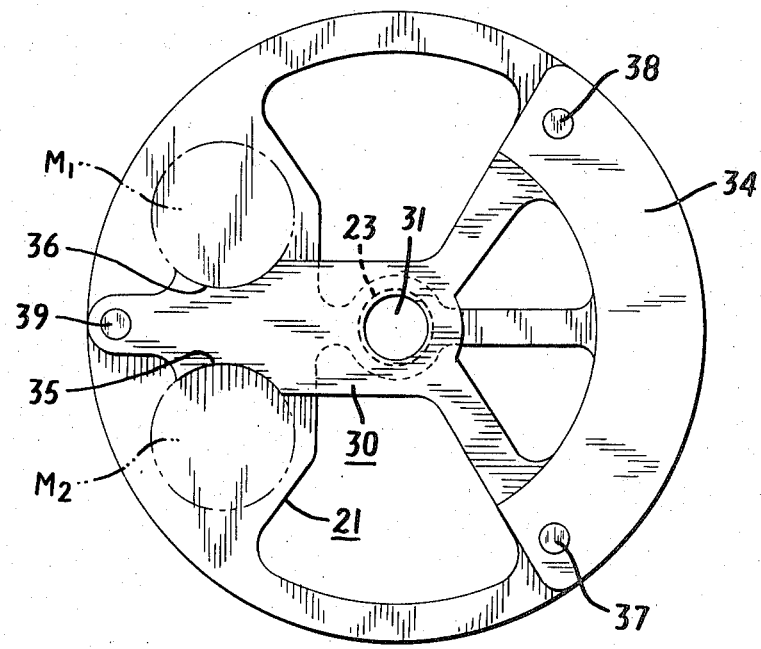
FIG. 3 is a plan view of the upper balance wheel in its assembled state.

The upper balance wheel 20 is shown in its disassembled state in FIG. 2 and in its assembled state in FIG. 3. The upper balance wheel 20 comprises a disc member 21 composed of magnetic material and a disc sector member 30 composed of nonmagnetic material. The disc member 21 has a central opening 23 through which the balance staff 1 extends and the opening has a diameter larger than that of the balance staff 1 to ensure that the disc member 21 does not touch or contact the balance staff. A series of cut-outs or openings 24, 25 are formed in the disc member 21 to reduce the weight of the member and a reinforcing rib 26 is provided to strengthen the disc member. Three guide holes 27, 28 and 29 are provided around a marginal peripheral portion of the disc member 21 and cooperate with pins on the disc section member 30 to effect positioning and attachment of the two members.

The disc sector member 30 has a central opening 31 for receiving therein the balance staff 1. The opening 31 has a diameter smaller than the diameter of the opening 23 and the opening 31 is dimensioned to tightly engage with the balance staff, as seen in FIG. 1. An opening or cutout 32 is provided in the disc sector member 30 for reducing the weight of the member. A marginal peripheral portion 34 of the disc sector member is made thicker and more massive than the remainder of the member and this thicker portion comprise a counterbalance weight for counterbalancing a set of permanent magnets $M_1$, $M_2$ affixed to the disc member 21.

Guide surfaces 35, 36 are formed on the disc sector member and have a shape complementing that of the permanent magnets and the guide surfaces function to guide the attachment of the permanent magnets to the disc member 21 and define the positions of attachment of the permanent magnet. A series of guide pins 37, 38 and 39 extend outwardly from the disc sector member and are positioned to be inserted into the guide holes 28, 29, 30 respectively.

During assembly of the upper balance wheel 20, the disc sector member 30 is superimposed upon the disc member 21 and oriented to the position shown in FIG. 3. The two members are then moved together to cause the guide pins 37, 38 and 39 to be inserted within the guide holes 27, 28 and 29 and the guide pins are then caulked or welded into the guide holes, thereby forming a unitary balance wheel structure having a nonmagnetic portion 30 and a magnetic portion 21. The set of permanent magnets $M_1$ and $M_2$ are then affixed to the magnetic disc member 21 and the arcuate guide surfaces 35, 36 facilitate the positioning of the permanent magnets relative to the disc member 21.

The mass of the counterbalance weight 34 is carefully chosen to offset or counterbalance the weight of the set of permanent magnets so that the resulting balance wheel is dynamically balanced. The permanent magnets cooperate with magnetic disc member 21 to form a closed magnetic flux path and the flux path is spaced from the balance staff 1 due to the oversized opening 23 and therefore flux leakage to the balance staff and the adjoining hairspring is prevented.

Figure 5:
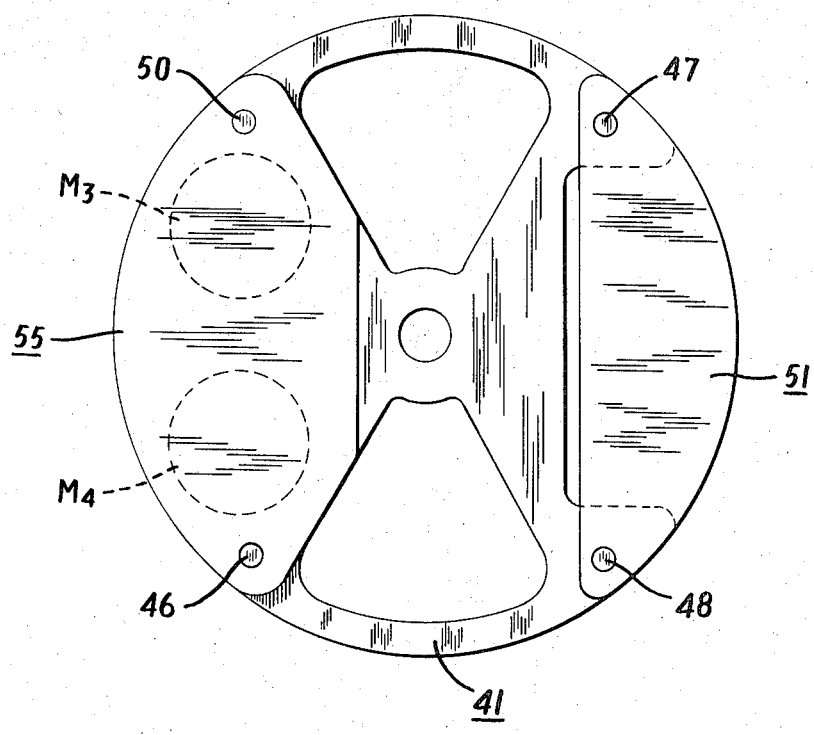
FIG. 5 is a plan view of the lower balance wheel in its assembled state.
Figure 4:
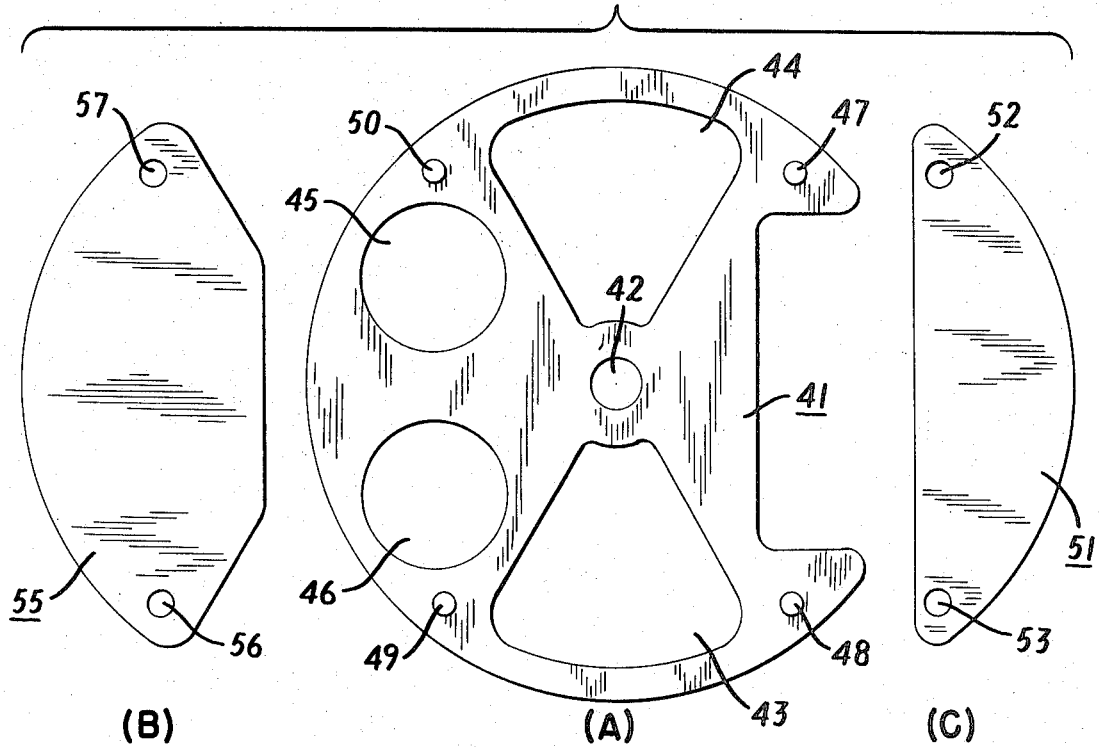
FIG. 4 is a plan view of the lower balance wheel in its disassembled state.

The lower balance wheel 40 is shown in its disassembled state in FIG. 4 and in its assembled state in FIG. 5. The lower balance wheel comprises a disc member 41 composed of nonmagnetic material, a counterbalance weight 51 composed of nonmagnetic material and a support plate 55 composed of magnetic material. The disc member 41 has a generally circular configuration and has a central opening 42 for receiving therethrough the balance staff 1 and pair of openings or cutouts 43, 44 for reducing the weight of mass of the balance wheel. A pair of circular guide openings 45, 46 are provided in the disc member for receiving therethrough a set of permanent magnets $M_3$, $M_4$ and the guide openings function as guide surfaces for defining the positions of attachment of the permanent magnets and for facilitating the assembly of the lower balance wheel. Four guide pins 47, 48, 49 and 50 extend outwardly from the disc member 41 and function to guide the attachement of the counterbalance weight 51 and the support plate 55 to the disc member.

The counterbalance weight 51 has a D-shape and has a weight which is carefully chosen in relation to that of the other components to counterbalance the weight of the permanent magnets. A pair of guide openings 52, 53 extend through the counterbalance weight and receive therethrough the guide pins 47, 48 during attachment of the counterbalance weight to the disc member 41.

The support plate 55 is the only component of the lower balance wheel 40 which is formed of magnetic material. The support plate 55 has a pair of guide openings 56, 57 which respectively cooperate with the guide pins 49, 50 to effect attachment of the support plate to the disc member 41.

FIG. 5 shows the lower balance wheel in its assembled state and during assembly, the counterbalance weight 51 is superposed on the disc member 41 and the guide pins 47, 48 are inserted into the guide openings 52, 53 respectively. The guide pins are then caulked or welded into the guide holes. In a similar manner, the support plate 55 is superposed on the disc member 41 and the guide pins 49, 50 are inserted into the guide holes 56, 57. The guide pins are then caulked or welded into the holes thereby forming a unitary balance wheel structure having a nonmagnetic portion 41, 51 and a magnetic portion 55. The set of permanent magnets $M_3$, $M_4$ are then inserted through the guide openings 45, 46 and affixed to the support plate 55.

Referring again to FIG. 1, the balance wheel assembly is shown in its assembled state. Each permanent magnet in the set of magnets affixed to the upper balance wheel 20 is in opposed spaced-apart alignment with a permanent magnet in the set of magnets affixed to the lower balance wheel 40. In the embodiment shown, each set of permanent magnets comprises two disc-shaped magnets. During use of the balance wheel assembly, a driving coil or detecting coil is fixedly disposed in the air gap between each pair of aligned magnets, as well known in the art, so that the coils cut the magnetic lines of force existing between each pair of permanent magnets during oscillation of the balance wheel assembly.

Thus it may be appreciated that the balance wheel assembly according to the present invention comprises a pair of balance wheels each having a nonmagnetic portion which is in contact with and affixed to the balance staff and a magnetic portion which is spaced from the balance staff and which supports the permanent magnets.

Though only the preferred embodiment of the invention has been shown and described, many modifications and changes can be made and it is understood that the present invention is intended to cover all such obvious modifications or changes falling within the spirit and scope of the invention defined in the appended claims.

What we claim is:

1. A balance wheel assembly for an electric timepiece comprising: a balance staff; first and second balance wheels connected to said balance staff in spaced-apart opposing relationship, said first balance wheel comprising a first disc member composed of magnetic material, and a disc sector member composed of nonmagnetic material superposed on and attached to said first disc member on the side thereof facing said second balance wheel; a second balance wheel comprising a second disc member composed of nonmagnetic material and having means therein defining guide openings extending completely through said second disc member, and a support plate composed of magnetic material superposed on and attached to said second disc member on the side thereof facing away from said first balance wheel; a first set of permanent magnets affixed to said first disc member of said first balance wheel and each facing towards said second balance wheel; and a second set of permanent magnets affixed to said support plate of said second balance wheel and extending through said guide openings in said second disc member and facing towards and in spaced alignment with respective ones of said first set of permanent magnets.

2. A balance wheel assembly according to claim 1; wherein each of said first and second sets of permanent magnets comprise two disc-shaped permanent magnets.

3. A balance wheel assembly according to claim 1; including means defining openings in said first and second disc members and disc sector member for reducing the mass of the balance wheel assembly.

4. A balance wheel assembly according to claim 1; including guide surfaces on said disc sector member each extending around at least a portion of one magnet of said first set and defining the positions of attachment of said magnets to said first disc member.

5. A balance wheel assembly according to claim 1; wherein said disc sector member has a weighted portion effectively counterbalancing the weight of said first set of permanent magnets.

6. A balance wheel assembly according to claim 1; including a counterbalance weight attached to said second disc member having a weight effective to counterbalance the weight of said second set of permanent magnets.

7. A balance wheel assembly according to claim 1; wherein said guide openings define the positions of attachment of said second set of permanent magnets to said second balance wheel.

8. A balance wheel assembly according to claim 7; including a counterbalance weight attached to said second disc member having a weight effective to counterbalance the weight of said second set of permanent magnets.

* * * * *